Aug. 21, 1951     F. LINNEMAN     2,564,702
BOAT TRAILER
Filed Feb. 27, 1948     3 Sheets-Sheet 1
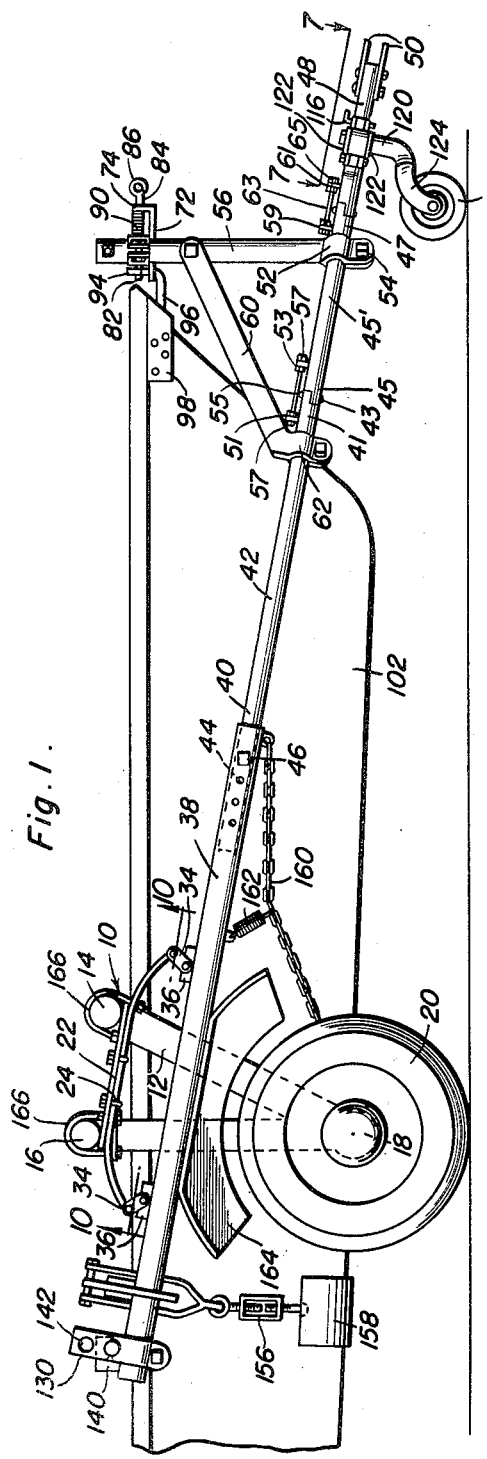
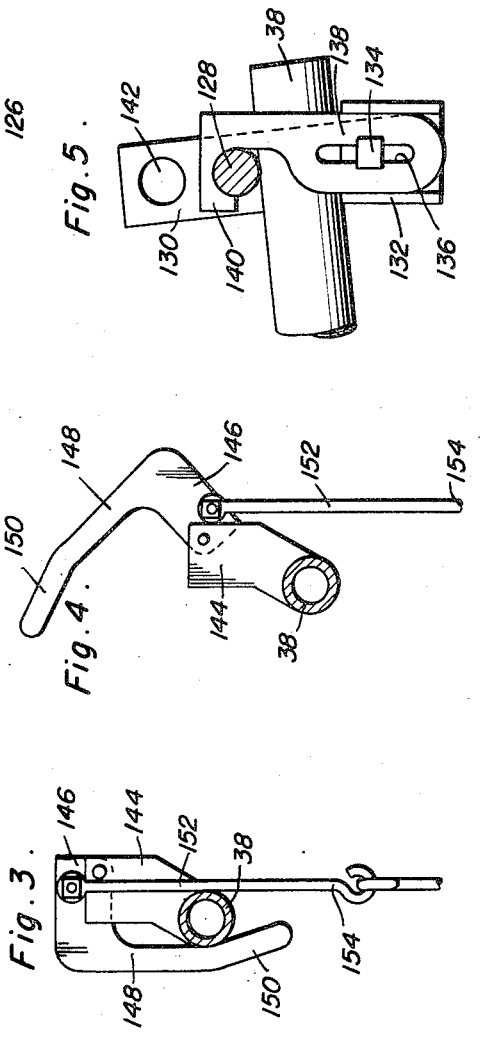
Inventor
Fred Linneman
By *Clarence A. O'Brien and Harvey B. Jacobson*
Attorneys

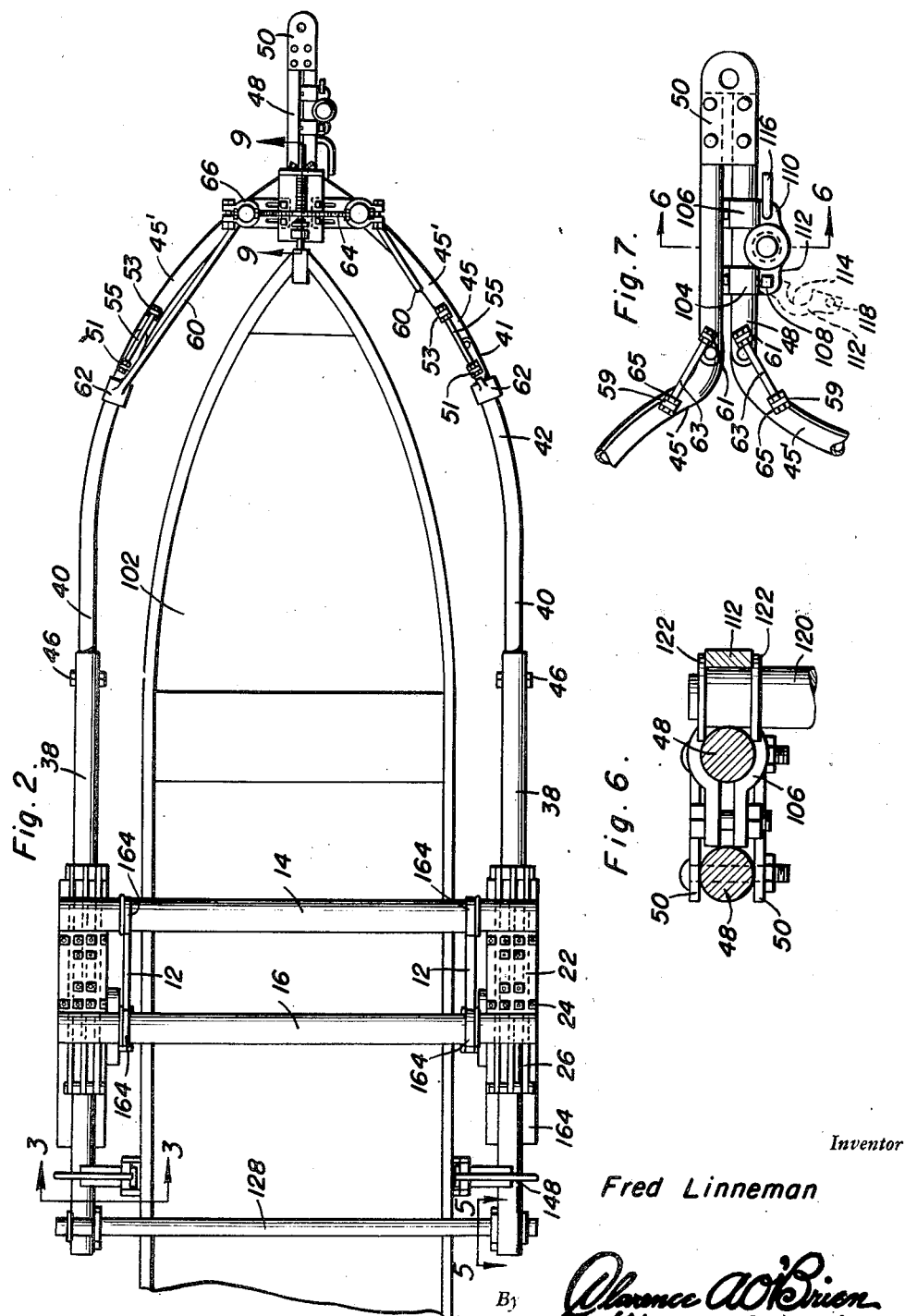

Aug. 21, 1951
F. LINNEMAN
2,564,702
BOAT TRAILER
Filed Feb. 27, 1948
3 Sheets-Sheet 3
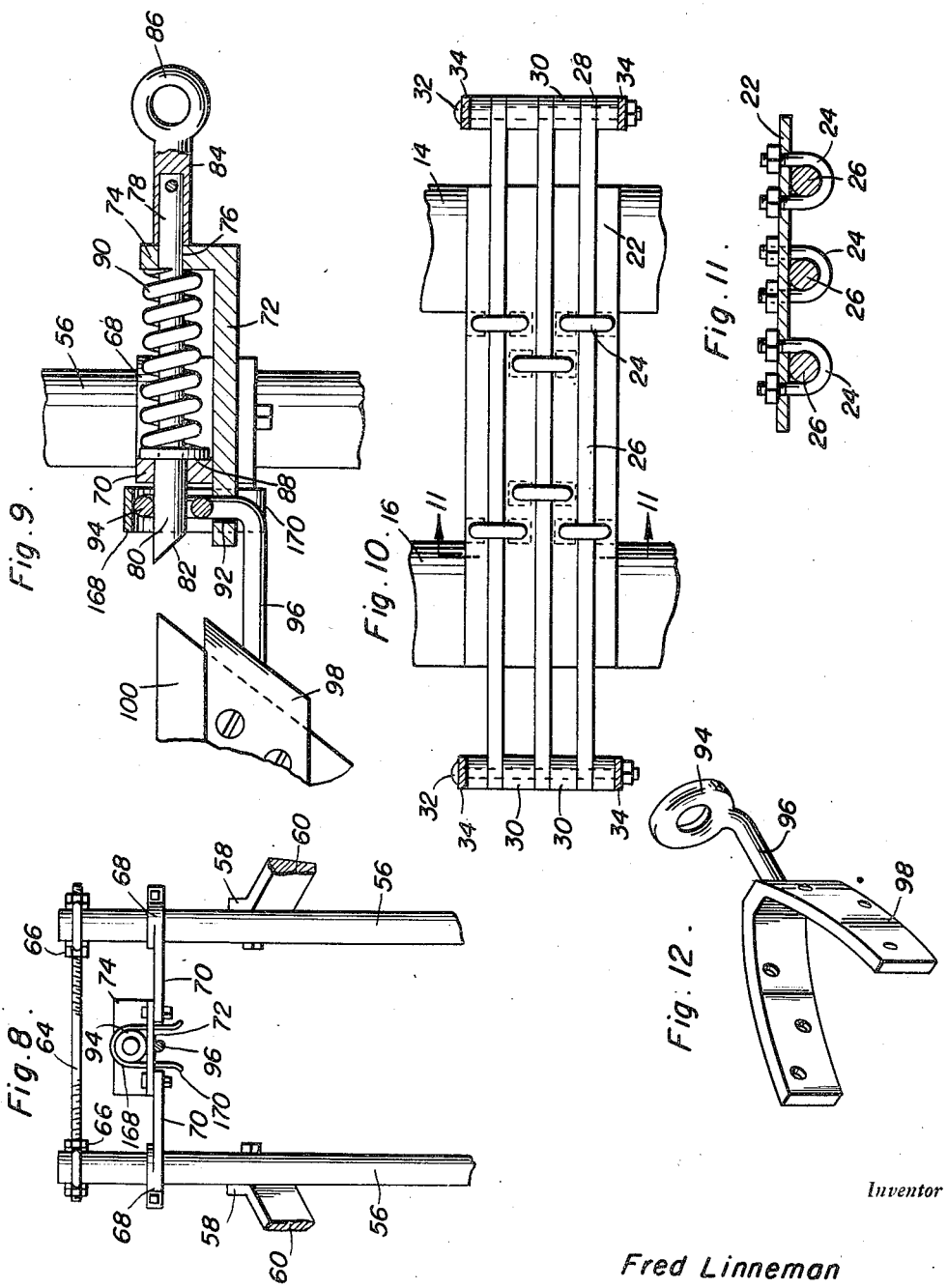
Inventor
Fred Linneman
By Clarence A. O'Brien
and Harvey B. Jacobson
Attorneys Patented Aug. 21, 1951

2,564,702

UNITED STATES PATENT OFFICE 2,564,702

BOAT TRAILER

Fred Linneman, Estilline, S. Dak.

Application February 27, 1948, Serial No. 11,369

10 Claims. (Cl. 280—33.4)

This invention relates to new and useful improvements in trailers and the primary object of the present invention is to provide a trailer including novel and improved means for quickly and readily applying a boat to the same in an elevated position.

Another important object of the present invention is to provide a boat trailer including a boat embracing frame that is conveniently adjustable to accommodate and support boats of various lengths and widths.

Another object of the present invention is to provide a boat trailer including novel and improved adjustable hanger means which are engageable with the bottom of a boat, and locking means for holding and retaining the hanger means and a boat engaged thereby, in a raised position for hauling.

Another object of the present invention is to provide a boat trailer including a wheeled frame, a pair of side rails which support a boat, and novel and improved shock reducing means for suspending the side rails from the wheeled frame.

Another object of the present invention is to provide a boat trailer including a forward guide wheel and novel and improved means for removably and pivotally securing the guide wheel to the trailer.

Another object of the present invention is to provide a boat trailer, the parts of which are quickly and readily assembled or disassembled facilitating the convenient shipping or storing of the same.

A further object of the present invention is to provide a boat trailer so designed as to facilitate a boat to be quickly and readily loaded thereon or removed therefrom in a convenient manner.

A still further aim of the present invention is to provide a boat trailer that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of the present trailer, and showing a boat (in part) applied thereto in a raised position for hauling;

Figure 2 is a top plan view of Figure 1;

Figure 3 is an enlarged transverse vertical sectional view taken substantially on the plane of section line 3—3 of Figure 2;

Figure 4 is a similar view of Figure 3, and showing the locking lever in a raised or unlocked position;

Figure 5 is an enlarged fragmentary vertical sectional view taken substantially on the plane of section line 5—5 of Figure 2;

Figure 6 is an enlarged transverse vertical sectional view taken substantially on the plane of section line 6—6 of Figure 7;

Figure 7 is an enlarged fragmentary longitudinal horizontal sectional view taken substantially on the plane of section line 7—7 of Figure 1;

Figure 8 is an enlarged fragmentary vertical sectional view of the forward end of the present trailer;

Figure 9 is an enlarged fragmentary longitudinal vertical sectional view taken substantially on the plane of section line 9—9 of Figure 2;

Figure 10 is an enlarged fragmentary top plan view of the present trailer taken substantially on the plane of section line 10—10 of Figure 1;

Figure 11 is an enlarged transverse vertical sectional view taken substantially on the plane of section line 11—11 of Figure 10; and Figure 12 is a perspective view of the anchor ring member which is mountable on the forward end of a boat.

Referring now to the drawings in detail, wherein for the purpose of illustration, there is disclosed a preferred embodiment of the present invention, numeral 10 represents the main frame or wheeled frame portion of the present boat trailer generally, comprising a pair of spaced parallel, upstanding, substantially V-shaped axle supporting members 12, the upper terminals of which rigidly engage a pair of spaced parallel main cross beams 14 and 16, and the lower terminals of which support an axle 18 that is provided with rotatable wheels 20.

Fixed by any suitable means to the lower periphery of the main cross beams 14 and 16, between adjacent ends thereof, is a pair of base or anchor plates 22 that removably support a plurality of depending substantially U-shaped table clamps or bolts 24. Held by the bolts 24 into frictional and clamping engagement with the lower face of the plates 22, is a plurality of spaced, parallel resilient bars or spring arms 26. The eye ends 28 of the resilient bars 26 are retained in spaced relationship to each other by spacing washers 30 which are connected to each other and to the eye ends 28 of the resilient bars 23 by connecting bolts and nuts 32. Pivotally engaging the connecting bolts and nuts 32 are pairs of links 34 that pivotally engage blocks 36 which are rigidly secured to the upper periphery of a pair of spaced parallel, longitudinally extending tubular side rails 38.

Slidably positioned in the tubular side rails 38, are the rear substantially straight end portions 40 of a pair of arcuate, forwardly converging side arms 42. The straight end portions 40 of the side arms 42 are provided with a plurality of longitudinally spaced openings 44, one of which engages a bolt and nut 46 removably carried by the tubular side rails 38 for longitudinal adjustment or positioning of the side arms 42 relative to the side rails 38.

The forward reduced terminal 41 of the side rails are pivoted as at 43 to the rear reduced flattened terminals of a pair of tubular extensions 45′, the forward reduced flattened terminals 47 of which are pivoted to the ends of a forwardly extending loop 48 to which there is fixedly secured a pair of spaced, forwardly projecting ears 50 that are suitably coupled or hitched to a towing vehicle.

Rigidly secured adjacent the reduced forward terminals 41 of the side arms 42 are upstanding ears 51 that cooperate with further ears 53 that are swiveled on the tubular extensions 45′ adjacent the rear reduced terminals thereof, to adjustably support threaded rods 55 and lock nuts 57 whereby a pivotal, inwardly or outwardly positioning of the extensions 45′ relative to each other may be maintained. Fixed adjacent the reduced forward ends 47 of the extensions 45′, are further upstanding ears 59 that oppose swiveled ears 61 carried by the ends of the loop 48. Threaded rods 63 supporting nuts 65 extend beneath the ears 59 and 61 for retaining the extensions 45′ in a selected pivoted position relative to each other.

Slidably and adjustably mounted on the extensions 45′, are split clamps 52 the free ends of which are connected by bolts and nuts 54. These sleeves 52 are rigidly secured to or form an integral part of a pair of preferably tubular uprights or support posts 56, that pivotally and removably engage the angulated ends 58 of a pair of outwardly diverging, downwardly and rearwardly inclined brace arms 60 which are provided with angularly disposed adjustable split clamps 62 that slidably and adjustably engage the side arms 42. The upper terminals of the support posts 56 are adjustably connected by a threaded rod 64 that receivably engages adjustable split clamps 66 mounted on the support posts 56 so that the rod 64 will remain substantially straight during adjustment of the support posts 56 toward or away from each other.

Adjustably and slidably mounted on the support posts 56, are split clamps 68 formed at the ends of a pair of inwardly directed support plates 70 that are removably secured to a substantially L-shaped guide plate 72, the shorter leg 74 of which is provided with a guide opening 76 that slidably engages a locking bolt 78 having an enlarged head portion 80 at one end including a tapered extremity 82, and a removable sleeve 84 at its opposite end that terminates in a finger engaging eye 86. Biased between the shorter leg 74 of the guide plate 72, and a washer 88 frictionally mounted on the locking bolt 78 and engaging the head portion 80, is a coil spring 90 that urges the head portion 80 of the locking bolt 78 outwardly from the shorter leg 74 of the guide plate 72. This guide plate 72 is provided with an opening 92 that slidably engages the angulated eye portion 94 of a spacer arm 96 which is rigidly secured to a substantially V-shaped anchor or base member 98 which is removably secured to the forward end 100 of a boat 102. In such a position, the head portion 80 of the locking bolt 78 extends through the eye 86 to hold the anchor plate 98 relative to the guide plate 72.

Removably secured on the forwardly extending loop 48, is a pair of spaced, split clamps or sleeves 104 and 106 having pairs of outwardly extending ears 108 and 110. The ears of one of the sleeves, for example ears 108 of sleeve 104, pivotally support a bearing 112 having an arcuate notch 114, and the other ears 106 of the clamp 110 removably support an angulated locking bar 106 that is adapted to extend through an aperture 118 provided in the free end of the bearing 112 to hold the said bearing 112 in a fixed position relative to the loop 48.

Fixed to a wheel supporting shaft 120 is a pair of spaced retaining collars or washers 122 between which the notch portion 114 of the bearing 112 engages to retain the shaft 120 rotatably positioned between the loop 48 and the bearing 112, as shown best in Figure 6 of the drawings. The lower end of the shaft 120 is provided with arcuate furcations 124 between which there is rotatably positioned a forward guide wheel 126.

The numeral 128 represents a clamping bar or cross bar which extends over the boat 102 and above the rear terminals of the tubular side rails 38. Frictionally mounted on and depending from the ends of this cross bar 128, are hanger links 130 that rigidly support bearing blocks 132 on which the lower periphery of the side rails 38 bear. Projecting outwardly from the opposed inner faces of the bearing blocks 132, are guide lugs 134 having enlarged outer ends. These lugs 134 slidably engage slots 136 provided in latch plates 138 which are provided with hook portions 140 that engage the ends of the cross bar 128 for holding the said cross bars 128 frictionally upon the upper periphery of the side rails 38, as shown best in Figure 5 of the drawings. The hanger links 130 are provided with auxiliary openings 142 for accommodating side rails 38 of various sizes or diameters.

Rigidly secured to the side rails 38, are pairs of spaced, upstanding ears 144 between which there are pivoted the enlarged angulated ends 146 of levers 148 that are provided with inclined, integral extensions 150. Pivotally and removably secured to the angulated ends 146 of the levers 148, are the bifurcated ends 152 of hook formed hangers 154 that pivotally support turn buckles 156. These turn buckles 156 are rigidly secured to a transverse band or belt 158 that extends beneath the boat 102. By pivoting or forcing the levers 148 outwardly and downwardly from their raised position as shown in Figure 4, so that the extensions 150 of the levers 148 frictionally engage the side rails 38, the hangers 154 will be raised to clampingly position the boat 102 between the band 158 and the cross bar 128.

Anchored to the forward ends of the side rails 38 and the lower ends of the supporting members 12 are bracing, preferably link chains 160 that are connected to the side rails 38 by coil springs 162 which reduce and prevent slack in the chains 160.

It is preferred, that fenders or mud shields 164 be fixed to the members 12 to loosely embrace the upper periphery of the wheels 20 to prevent stones or the like engaged by the wheels from harmfully striking the boat 102.

In practical use of the present boat trailer, the boat 102 is pulled forwardly between the members 12 and rests upon the band 158. The levers 148 are pivoted to a locked position so that the boat will be supported on the band 158 above the ground surface and clampingly positioned between the cross bar 128 and the band 158. The locking bolt 78 is then engaged with the eye portion 94 to retain the forward end of the boat in a raised position, with the boat supported in an elevated position on the wheels 20 and 126, whereby the same may be conveniently pushed or dragged to or from a towing vehicle. Upon coupling the plates 52 to the towing vehicle, the shaft 120 and wheel 126 may be quickly and readily removed from the loop 48, to prevent undue wear on the wheel 126.

Obviously, the adjustability and removability of the many parts in the present trailer structure facilitate its application and use with boats of various lengths and widths in a convenient manner, and for use in hauling boats to and from the water's edge as well as for transporting boats to desired locations for use.

It should be noted, that inverted U-shaped straps 164 embrace the upper peripheries of the main cross beams 14 and 16 and have their ends rigidly secured to the axle supporting members 12 to prevent longitudinal or pivotal movement of the beams 14 and 16 relative to the members 12. Also, U bolts 166 are removably secured on the beams 14 and 16, adjacent the ends thereof to further prevent movement of the members 12 and beams 14 and 16 to each other and to facilitate the adjustment of the members 12 toward or away from each other for use in conjunction with boats of various widths.

It is preferred, that an inverted U-shaped resilient guide member 168 having depending flared ends 170 be positioned in any suitable manner in the opening 92 to guide and aid in the positioning of the eye portion 94 in the opening 92 so that the eye portion 94 will register with head portion 80 of the locking bolt 78.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A boat trailer comprising a wheeled frame, a pair of side supports, resilient means connecting the side supports to the frame, hanger means carried by the side supports for adjustably engaging the bottom of a boat, lever means mounted on said side supports and connected to said hanger means for raising and lowering the hanger means and for locking the hanger means in a raised position toward the side supports, a forward frame slidably and adjustably carried by the side supports, means for lockably attaching the forward end of a boat to the forward frame and means bracing said side supports to said frame and restricting movement of said side supports relative to said frame in one direction.

2. The combination of claim 1 wherein said forward frame includes a wheel support, and means removably securing said wheel support to said forward frame, said means for removably securing the wheel support to the forward frame includes a pair of split clamps, a pivotal bearing carried by one of the split clamps, and means for locking the pivotal bearing in a fixed position to the other of the split clamps.

3. The combination of claim 1 wherein said means for lockably attaching the forward end of a boat to the forward frame includes a guide rigidly carried by the forward frame, a locking bolt slidably carried by the guide, and means adapted to be mounted on the forward end of a boat for lockably engaging the bolt.

4. The combination of claim 1 wherein the hanger means includes a support band extendable beneath the bottom of a boat, and a crossbar extending between said side supports and cooperating with said band to clamp a boat between said band and said cross-bar.

5. A boat trailer comprising a wheeled frame, a pair of spaced side walls, resilient suspension means carried by said frame and supporting the side rails, adjustable hanger means carried by said side rails including a supporting band adapted to extend beneath the bottom of a boat, a cross bar adapted to extend over the sides of a boat and overlying the band, means for removably attaching said cross bar to said side rails, lever means mounted on said side rails and connected to said hanger means for raising and lowering the hanger means and for locking the hanger means in a raised position whereby a boat may be clamped between the supporting band and cross member, a forward frame, means adjustably and removably securing said forward frame to said side rails, a wheel support, means for removably and pivotally securing the wheel support to said forward frame, and means carried by said forward frame adapted to lockably engage the forward end of a boat.

6. A boat trailer comprising a wheeled frame, a pair of spaced tubular side rails, resilient suspension means carried by the wheeled frame and supporting the side rails, adjustable hanger means carried by the side rails including a supporting band adapted to extend beneath a boat, a cross bar adapted to extend over the sides of a boat and above the band, means for removably securing the cross bar to the side rails, means mounted on said side rails and connected to said hanger means for raising and lowering the hanger means and for locking the hanger means in a raised position whereby a boat may be clamped between the supporting band and cross member, a forward frame including a pair of arcuate side arms slidably carried by the side rails, means for locking the side arms in a selected extended position to the side rails, locking means carried by the forward frame adapted to support the forward end of a boat in a raised position, a removable forward wheel carried by the forward frame, and means bracing the side rails to said wheeled frame and limiting movement of said side rails relative to said wheeled frame in one direction.

7. A boat trailer comprising a wheeled frame, a pair of spaced tubular side rails, resilient means connecting the side rails to the wheeled frame, adjustable hanger means carried by the side rails including a supporting band adapted to extend beneath a boat, a cross bar adapted to extend over the sides of a boat, means for removably securing the cross bar to the side rails, means mounted on said side rails and connected to said hanger means for raising and lowering the hanger means and for locking the hanger means in a raised position whereby a boat may be clamped between the supporting band and cross member, a pair of forwardly converging arcuate side arms slidably carried by said side rails, means for adjusting said side arms in an extended position relative to said side rails, an upright slidably and adjustably carried by each of said side arms, means bracing said uprights to said side arms, a guide, means adjustably securing said guide on said uprights, a locking bolt carried by said guide, means adapted to be mounted on the forward end of a boat for lockably engaging said bolt, and a forward wheel removably carried by said forward frame.

8. A boat trailer comprising a wheeled frame including a pair of substantially V-shaped axle supporting members, a pair of main cross beams secured to the upper ends of said axle supporting members, anchor plates fixed between said cross beams, a plurality of spaced parallel resilient bars secured to said anchor plates, means joining the outer ends of said bars, a pair of side members secured to and supported by the outer ends of said bars, a cross-bar adjustably and removably secured to said side members, a band underlying said cross-bar and adapted to extend beneath a boat, and means operatively connecting the band to the side members for raising the band and for locking the band in a raised position, said means for raising the band includes a substantially L-shaped lever pivoted at its shorter leg to one of said side members, a hanger connecting the shorter leg of said L-shaped lever to said band, said hanger and the longer leg of said lever adapted to clamp against one of said side members.

9. In a trailer including a pair of side members, a cross-bar terminally attached to said side members, a band underlying the cross-bar, a substantially L-shaped lever, a first pivot securing the shorter leg of said lever to one of said side members, a hanger attached to said band, and a second pivot securing the hanger to the shorter leg of said lever, said second pivot being parallel to said first pivot and located closer to the longer leg of said lever than said first pivot, said hanger being located between the longer leg of said lever and said first pivot to retain the longer leg of said lever against said one of said side members and the hanger raised whereby a boat may be clamped between said band and said cross-bar.

10. In a trailer including a pair of side members, a cross-bar terminally attached to said side members, a band underlying the cross-bar, a pair of substantially L-shaped levers, a first pair of pivots securing the shorter legs of said levers to said side members, a hanger attached to each end of said band, and a second pair of pivots securing the hangers to the shorter legs of said levers, said second pair of pivots being spaced parallel to said first pair of pivots and located closer to the longer legs of said levers than said first pair of pivots, said hangers being located between the longer legs of said levers and said first pair of pivots to retain the longer legs of said levers against said side members and the hangers raised whereby a boat may be clamped between said band and said cross-bar.

FRED LINNEMAN.

REFERENCES CITED

The following references are of record in the file of this patent:

UNITED STATES PATENTS

| Number | Name | Date |
| --- | --- | --- |
| 804,863 | Kempton | Nov. 21, 1905 |
| 1,123,509 | Forest et al. | Jan. 5, 1915 |
| 1,459,521 | Wenneborg | June 19, 1923 |
| 1,531,180 | Erickson | Mar. 24, 1925 |
| 1,779,887 | Melanson | Oct. 28, 1930 |
| 2,328,138 | Gosser | Aug. 31, 1943 |
| 2,374,383 | Sampsell | Apr. 24, 1945 |
| 2,375,754 | Ballinger | May 15, 1945 |
| 2,415,771 | Van Agtmael | Feb. 11, 1947 |
| 2,442,248 | Sampsell | May 25, 1948 |
| 2,448,443 | Krake | Aug. 31, 1948 |